F. PINCKERT.
LIFTING ATTACHMENT FOR MOWING MACHINES.
APPLICATION FILED JULY 27, 1911.
1,048,731.
Patented Dec. 31, 1912.
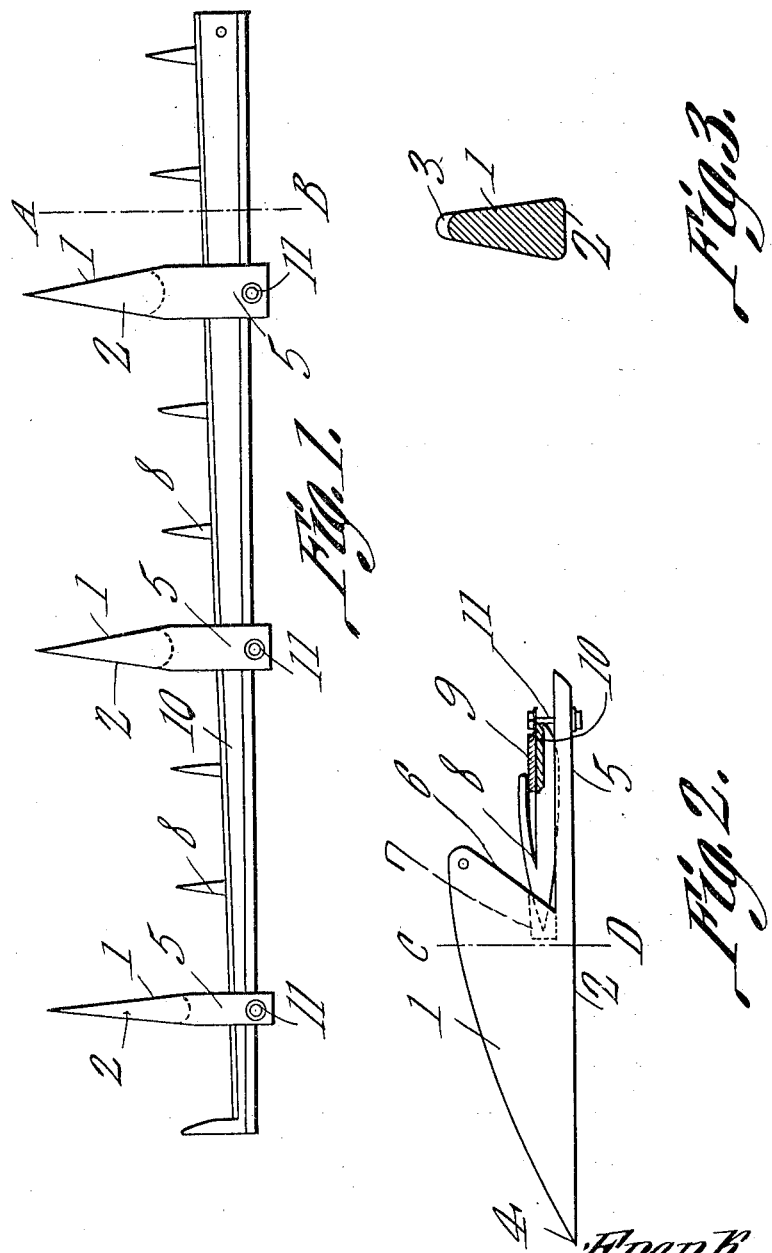
Witnesses
Frank Pinckert,
Inventor
by
Attorneys

UNITED STATES PATENT OFFICE.

FRANK PINCKERT, OF CARTHAGE, MISSOURI.

LIFTING ATTACHMENT FOR MOWING-MACHINES.

1,048,731.  Specification of Letters Patent.  Patented Dec. 31, 1912.

Application filed July 27, 1911. Serial No. 640,924.

*To all whom it may concern:*

Be it known that I, FRANK PINCKERT, a citizen of the United States, residing at Carthage, in the county of Jasper and State of Missouri, have invented a new and useful Lifting Attachment for Mowing-Machines, of which the following is a specification.

This invention relates to lifting attachments for mowing machines and is more particularly designed for use in harvesting peas and fallen grain.

One of the objects of the invention is to provide a lifting finger adapted to support the finger bar and the sickle guards of the mowing machine out of contact with the ground so that, as the machine moves forward, the lifting fingers will operate as runners and enable the finger bar and guards to pass over stones and other small obstructions in the path of the machine without injury to any of the parts.

A further object is to provide lifting fingers which operate to deflect stones and the like in the path thereof so that they will not interfere with the proper movement of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, the preferred form of the invention has been shown.

In said drawings:—Figure 1 is a bottom plan view of a finger bar and guard supported by the lifting fingers constituting the present invention. Fig. 2 is an enlarged section on line A—B Fig. 1. Fig. 3 is a section on line C—D Fig. 2.

Referring to the figures by characters of reference 1 designates a finger bar having a broad flat base or sole 2 and the sides of the finger bar converge upwardly to form a curved ridge 3 extending forwardly and downwardly to the sole 2 so as to form a point 4. The ridge 3 overhangs a tongue 5 extending rearwardly from the base of the finger and the overhanging shoulder 6 formed by the finger at the front end of the tongue 5 has a recess or socket 7 therein adapted to receive the point of one of the guards 8 of the sickle bar 9. A finger bar 10 is mounted on the tongue 5 and is secured thereto by a bolt 11, or any other suitable means. It is to be understood that these lifting fingers 1 are to be placed at any desired intervals along the finger bar 10 and that the tongues 5, which extend under said bar, serve to hold the bar constantly out of contact with the ground. The guards 8 are also supported out of contact with the ground. Obviously, therefore, when the machine is moved forward, the advancing points 4 of the lifting bars will move under the vines or the fallen grain and lift them onto the ridges 3. The said lifted growths will thus be fed to the sickle bar and accurately cut. There is no danger of the finger bar, the guards or the sickle bar becoming injured by small stones or other obstructions in the path of the machine because the tongue 5 operates as a runner to carry the said parts over such obstructions. Moreover should any stones be mounted loosely in the path of the finger 1, they will be shifted laterally so as not to deflect the parts during their forward movement or necessitate tilting any portion of the machine so that said parts can pass over the obstructions.

What I claim is:—

A lifting finger for mowing machines formed in a single piece and consisting of an element having upwardly converging side faces forming a ridge curved upwardly and rearwardly, the forward end of the ridge terminating in a point in alinement with the base of the finger, there being a rearwardly extending tongue integral with the rear end of the finger and a shoulder integral with the ridge and overhanging the tongue, said shoulder having a hole in its rear face for the reception of the point of a guard on a finger bar, the wall of said hole coöperating with the guard to hold the finger against lateral and vertical displacement.

In testimony that I claim the foregoing as my own, I have hereto affixed my signature in the presence of two witnesses.

FRANK PINCKERT.

Witnesses:
R. A. MOONEYHAM,
A. W. HOUGH.